US012591639B2

(12) United States Patent
Wu et al.

(10) Patent No.: US 12,591,639 B2
(45) Date of Patent: Mar. 31, 2026

(54) RESOURCE BASED LICENSING

(71) Applicant: MICRO FOCUS LLC, Santa Clara, CA (US)

(72) Inventors: Fei Wu, Shanghai (CN); You-You Huang, Shanghai (CN); Qiuxia Song, Shanghai (CN)

(73) Assignee: Micro Focus LLC, Santa Clara, CA (US)

( * ) Notice: Subject to any disclaimer, the term of this patent is extended or adjusted under 35 U.S.C. 154(b) by 53 days.

(21) Appl. No.: 18/196,769

(22) Filed: May 12, 2023

(65) Prior Publication Data

US 2024/0378265 A1     Nov. 14, 2024

(51) Int. Cl.
G06F 21/10          (2013.01)

(52) U.S. Cl.
CPC ................................. G06F 21/105 (2013.01)

(58) Field of Classification Search
None
See application file for complete search history.

(56) References Cited

U.S. PATENT DOCUMENTS

| | | | |
|---|---|---|---|
| 9,262,210 B2 | 2/2016 | Caufield | |
| 9,529,626 B2 | 12/2016 | Wang | |
| 9,607,353 B2 | 3/2017 | Li | |
| 10,169,090 B2 | 1/2019 | Wang | |
| 11,120,144 B1 * | 9/2021 | Kassam-Adams | .... H04L 9/0643 |
| 11,144,365 B1 * | 10/2021 | Gordon | ................. G06F 9/5077 |

| | | | |
|---|---|---|---|
| 2007/0180490 A1 * | 8/2007 | Renzi | .................... G06F 21/604 |
| | | | 726/1 |
| 2009/0037287 A1 * | 2/2009 | Baitalmal | ............. G06F 21/128 |
| | | | 705/27.1 |
| 2015/0121555 A1 * | 4/2015 | Scapa | .................. G06Q 50/184 |
| | | | 726/30 |
| 2023/0125904 A1 * | 4/2023 | Willett | .................... G06F 21/57 |
| | | | 726/30 |

FOREIGN PATENT DOCUMENTS

| | | | | |
|---|---|---|---|---|
| EP | 4180958 A1 * | 5/2023 | ........... | G06F 9/5033 |
| WO | WO-2022016102 A1 * | 1/2022 | ............. | G06F 21/10 |

OTHER PUBLICATIONS

Rimal, B. P., et al, "Workflow Scheduling in Multi-Tenant Cloud Computing Environments", IEEE Transactions on Parallel and Distributed Systems (vol. 28, Issue: 1, 2017, pp. 290-304) (Year: 2017).*

* cited by examiner

*Primary Examiner* — Clay C Lee

(74) *Attorney, Agent, or Firm* — Sheridan Ross P.C.

(57)          ABSTRACT

A request is received from a tenant. For example, the tenant may be a tenant of a multi-tenant cloud service. The request comprises a one or more Configuration Items (CIs). A CI is used to change data on a computer system or network. A computer resource license associated with the tenant is identified. A determination is made to identify if the request meets the computer resource license. In response to the request meeting the computer resource license, the one or more configuration items are implemented according to the computer resource license. In response to the request not meeting the computer resource license, the request is modified. For example, the request may be split into a plurality of requests.

20 Claims, 7 Drawing Sheets

RESOURCE BASED LICENSING

FIELD

The disclosure relates generally to software licensing and particularly to software licensing based on resource usage.

BACKGROUND

Traditional licensing deals with associating the licenses with a particular user or based on a number of active users. This works well for software that is being accessed locally or with simple cloud-based systems. However, with more complex cloud-based systems, traditional licensing based on users/active users may not always meet the needs of the cloud.

SUMMARY

These and other needs are addressed by the various embodiments and configurations of the present disclosure. The present disclosure can provide a number of advantages depending on the particular configuration. These and other advantages will be apparent from the disclosure contained herein.

A request is received from a tenant. For example, the tenant may be a tenant of a multi-tenant cloud service. The request comprises a one or more Configuration Items (CIs). A CI is used to change data on a computer system or network. A computer resource license associated with the tenant is identified. A determination is made to identify if the request meets the computer resource license. In response to the request meeting the computer resource license, the one or more configuration items are implemented according to the computer resource license. In response to the request not meeting the computer resource license, the request is modified. For example, the request may be split into a plurality of requests.

The phrases "at least one", "one or more", "or," and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

As described herein and in the claims, configuring a computer resource in regard to licensing is different than traditional licensing. One form of traditional licensing is user-based licensing. For example, an application may be defined to allow a specific number of licenses for users on a network. Each user may have their own license or it may be based on active users (e.g., in a cloud environment). Another type of traditional licensing is based on a number of nodes. For example, a database for a first tenant may have five nodes and a database for a second tenant may have ten nodes. Thus, the licensing for the first tenant may be less than the second tenant which has more nodes.

On the other hand, computer resource licensing is based on a number of Configuration Items (CIs) that are being requested to be changed over a time period. For example, a CI may include setting a memory size used by an application, configuring a network, setting a device's Internet Protocol (IP) address, configuring a port on a firewall, defining IP address ranges used by a load balancer, defining thread usage for an application, defining virtual machine usage, defining container usage, a database read, a database write, and/or the like.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate" and "compute," and variations thereof, as used herein, are used interchangeably, and include any type of methodology, process, mathematical operation, or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
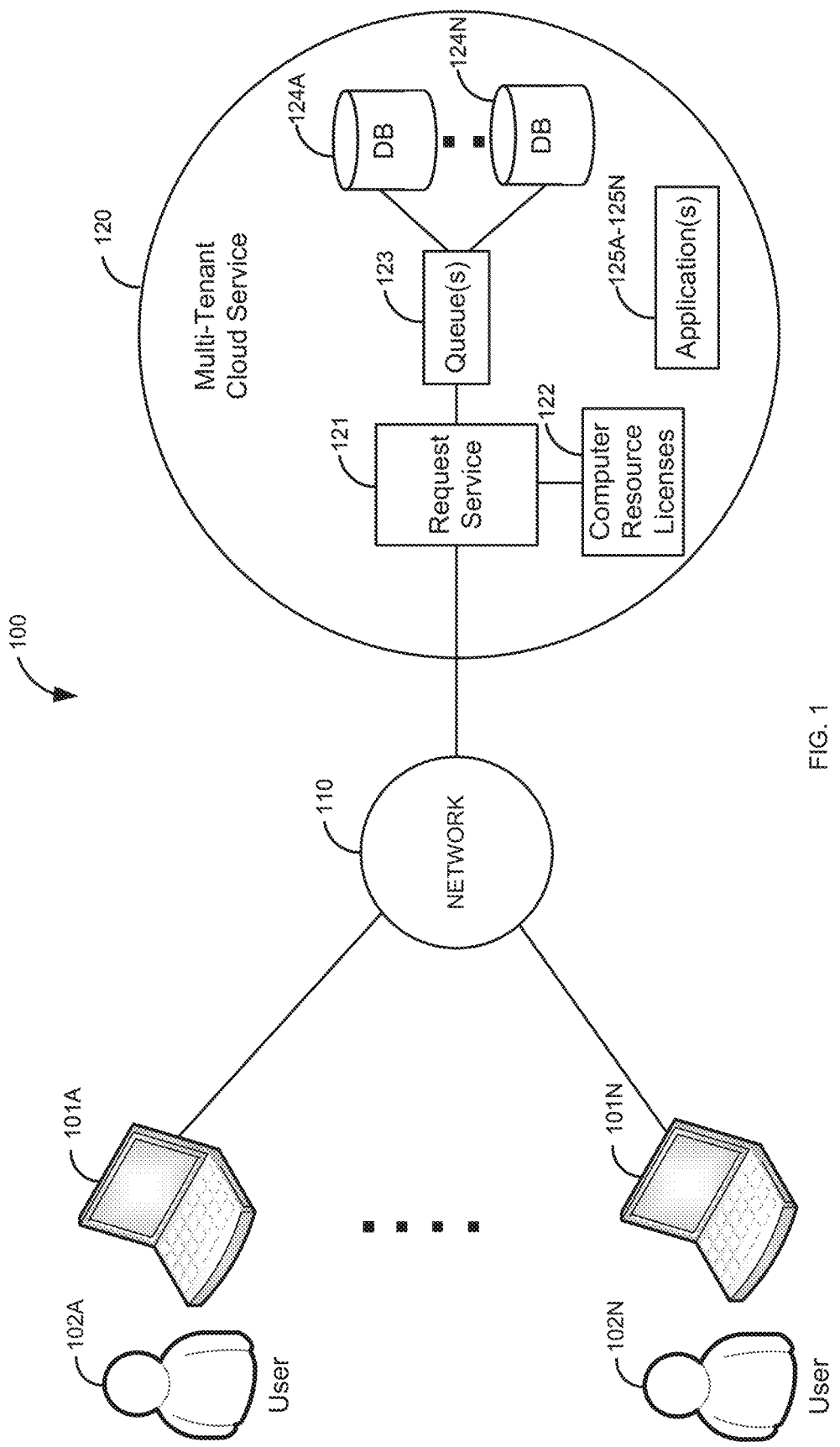
FIG. 1 is a block diagram of a first illustrative system for managing computer resource-based licensing.

FIG. 1 is a block diagram of a first illustrative system 100 for managing computer resource-based licensing. The first illustrative system 100 comprises communication devices 101A-101N, a network 110, and a multi-tenant cloud service 120. In addition, users 102A-102N are shown for convenience.

The communication devices 101A-101N can be or may include any device that can communicate with the multi-tenant cloud service 120, such as a Personal Computer (PC), a telephone, a video system, a cellular telephone, a Personal Digital Assistant (PDA), a tablet device, a notebook device, a smartphone, and/or the like. As shown in FIG. 1, any number of communication devices 101A-101N may be connected to the network 110.

The users 102A-102N are users 102A-101N of the multi-tenant cloud service 120. Each of the users 102A-102N may be associated with a tenant. For example, the user 102A may be associated with the tenant A and user 102N may be associated with the tenant N. Multiple users 102 may be associated with a single tenant. A tenant may be an individual user 102, a group, an organization, and/or the like. For example, a tenant may be a corporation.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 110 can use a variety of electronic protocols, such as Ethernet, Internet Protocol (IP), Hyper Text Transfer Protocol (HTTP), Web Real-Time Protocol (Web RTC), and/or the like. Thus, the network 110 is an electronic communication network configured to carry messages via packets and/or circuit switched communications.

The multi-tenant cloud service 120 can be any cloud service that can provide services to the users 102A-102N on a tenant basis. The multi-tenant cloud service 120 may provide various types of cloud services, such as, database services, network management services, security services, web services, Information Technology (IT) services, and/or the like. The multi-tenant cloud service 120 further comprises a request service 121, computer resource licenses 122, queue(s) 123, databases 124A-124N, and application(s) 125A-125N.

The request service 121 receives CIs based on the request 201 from the users 102A-102N to configure the applications 125A-125N. The requests 201 are based on a tenant. A CI may include any type of configuration item, such as, modifying records in a database 124, creating records in a database 124, changing Internet Protocol (IP) addresses on devices on the network 110, changing port numbers used by an application 125, assigning inbound/outbound ports on a firewall, setting user accounts, assigning memory allocation for an application 125, assigning a maximum number of threads used by an application 125, configuring an application 125, configuring an operating system, configuring a virtual machine, configuring a container, and/or the like.

The request service 121 manages the CIs based on the computer resource licenses 122. The computer resource licenses 122 are based on the tenants. To illustrate, an exemplary computer resource license 122 is shown below in Table 1.

TABLE 1

| CI Type | Tenant | License - Number of CIs | Period | Priority |
|---------|--------|--------------------------|--------|----------|
| All | Tenant A | 1,000 | Second | 1 |
| All | Tenant N | 500 | Second | 1 |

In Table 1, the tenant A has a 1,000 CIs per second license and the tenant N has a 500 CIs per second license. Both the computer resource licenses 122 have a priority of one. The priority indicates a priority over other tenants who may have a lower priority. This may mean that a request 201 is placed higher in the queue 123 based on the priority than a lower priority request 201. The two computer resource licenses 122 for the tenants A and N may be in separate license files or in the same license file. In Table 1, the license for both tenants A/N are for all CI types.

However, in another embodiment, the computer resource licenses 122 may include licenses based on a type of CI. For example, as shown below in Table 2, the computer resource license 122 is divided into license types for each tenant.

TABLE 2

| CI Type | Tenant | License - Number of CIs | Period | Priority |
|---|---|---|---|---|
| Database 124X | Tenant A | 10,000 | Minute | 1 |
| Database 124Y | Tenant A | 2,000 | Minute | 2 |
| Server CIs | Tenant A | 250 | Second | 1 |
| All | Tenant B | 500 | Second | 2 |
| Database 124Z | Tenant N | 1,000 | Second | 1 |

Tenant A has a license for database 124X for 10,000 CIs a minute, for database 124Y for 2,000 CIs per minute, and for 250 CIs per second for server CIs. The database 124X and the server CIs have a level one priority, and the database 124Y has a level two priority (a lower priority). Tenant B has a license for 500 CIs per second that covers all the types of CIs. Tenant B has a priority of two. Tenant N has a license for database 124Z for 1,000 CIs per second at a priority of one.

Although not shown in Table 2, a CI type may be based on an amount of work/computer resources required by the CI type. For example, configuring a first type of device may take more computer resources (e.g., more memory, more threads, more disk space, etc.) than configuring a second type of device.

The request service 121 takes the CI requests 201 and places them into the queue(s) 123. The CI requests 201 are then processed (e.g., a first-in-first-out process, priority based, and/or the like) and the CIs are sent to the databases 124A-124N. There may be a single queue 123 for all tenants or a separate queue 123 for each tenant.

The databases 124A-124N may be regular databases, application databases, operating system configuration databases, network databases (e.g., a Simple Network Management Protocol Management Information Base (SNMP MIB), a firewall configuration database, a file system, and/or the like. The databases 124A-124N may be separate databases 124A-124N for each tenant.

Figure 2:
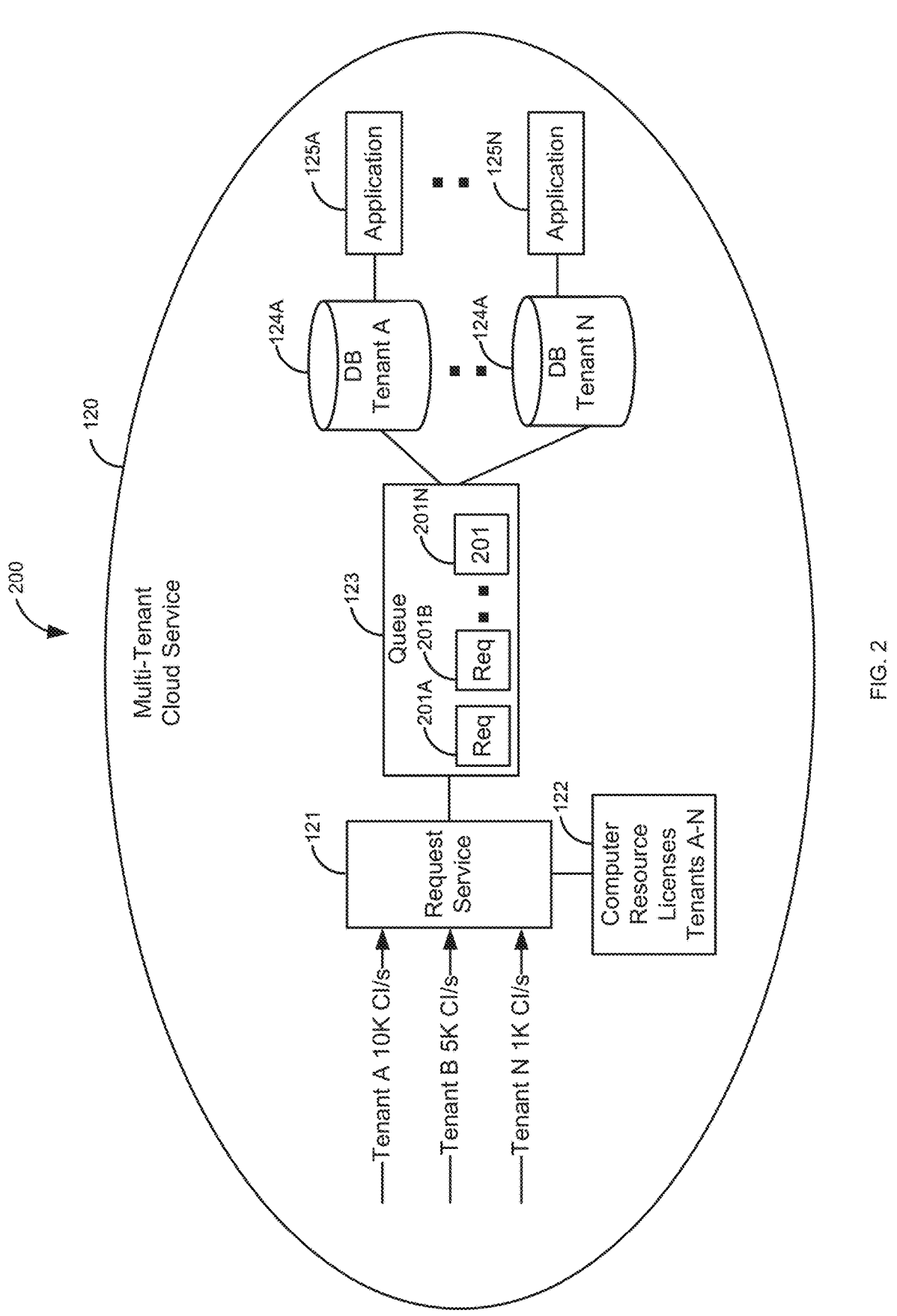
FIG. 2 is a block diagram showing an expanded view of a multi-tenant cloud service.

FIG. 2 is a block diagram is an expanded view 200 of a multi-tenant cloud service 120. In FIG. 2, the request service 121 receives three requests 201A-201N. Tenant A has made a request 201 for 10,000 CIs a second, tenant B has made a request 201 for 5,000 CIs a second and tenant N has made a request 201 for 1,000 CIs a second. The three requests 201A-201N are compared to the computer resource licenses 122 for each of the tenants A-N. The request service 121 then creates the requests 201A-201N in the queue 123 based on the computer resource licenses 122. The requests 201A-201N may be merged, split, and/or the like. For example, if the tenant A is only licensed for 5,000 CIs a second, then the 10,000 CI request 201 may be broken into two requests 201 to comply with the computer resource license 122 for tenant A.

In FIG. 2, the requests 201A-201N are then sent to separate databases 124A-124N. The separate databases 124A-124N are tenant based. For example, the database 124A is associated with the tenant A, the database 124B is associated with the tenant B, and the database 124N is associated with the tenant N. The databases 124A-124N are associated with the applications 125A-125N. For example, the application 125A may be a database application, the application 125B may be a webserver application, and the application 125N may be a firewall application. In one embodiment, the applications 125A-125N may be the same type of application 125 (e.g., a database application) for each of the tenants.

Figure 3:
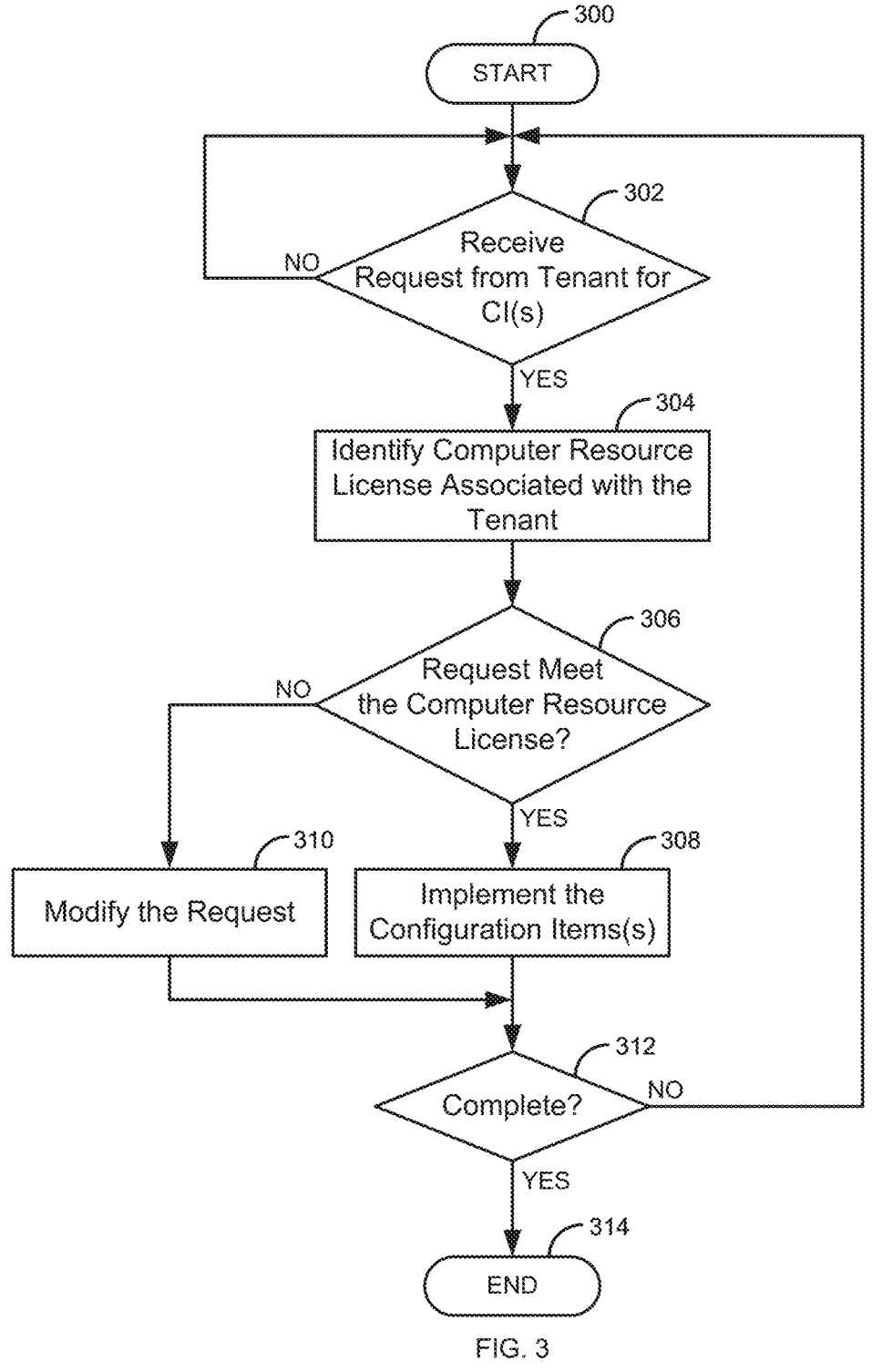
FIG. 3 is a flow diagram of a process for managing computer resource-based licensing.

FIG. 3 is a flow diagram of a process for managing computer resource-based licensing. Illustratively, the communication devices 101A-101N, the multi-tenant cloud service 120, the request service 121, the computer resource licenses 122, the queue(s) 123, the databases 124A-124N, and the application(s) 125A-125N are stored-program-controlled entities, such as a computer or microprocessor, which performs the method of FIGS. 3-7 and the processes described herein by executing program instructions stored in a computer readable storage medium, such as a memory (i.e., a computer memory, a hard disk, and/or the like). Although the methods described in FIGS. 3-7 are shown in a specific order, one of skill in the art would recognize that the steps in FIGS. 3-7 may be implemented in different orders and/or be implemented in a multi-threaded environment. Moreover, various steps may be omitted or added based on implementation.

The process starts in step 300. The request service 121 waits in, step 302, to receive a request 201 from a tenant to implement one or more CIs. If a request 201 to implement the one or more CIs is not received in step 302, the process of step 302 repeats. Otherwise, if a request 201 to implement one or more CIs is received in step 302, the request service 121 identifies the computer resource license 122 associated with the tenant in step 304. The request service 121, determines, in step 306, if the request 201 meets the computer resource license 122. If the request 201 does not meet the computer resource license 122 in step 306, the request service 121 modifies the request 201 in step 310 and the process goes to step 312. For example, the request 201 may be split into multiple requests 201 in step 310.

If the request 201 meets the computer resource license 122 in step 306, the request service 121 implements the configuration items according to the computer resource license 122 in step 308. For example, the request 201 may be implemented directly, or the request 201 may be placed into the queue 123 where the request 201 will be implemented as the request 201 is removed from the queue 123.

The request service 121 determines, in step 312, if the process is complete. If the process is not complete in step 312, the process goes back to step 302. Otherwise, if the process is complete in step 312, the process ends in step 314.

Figure 4:
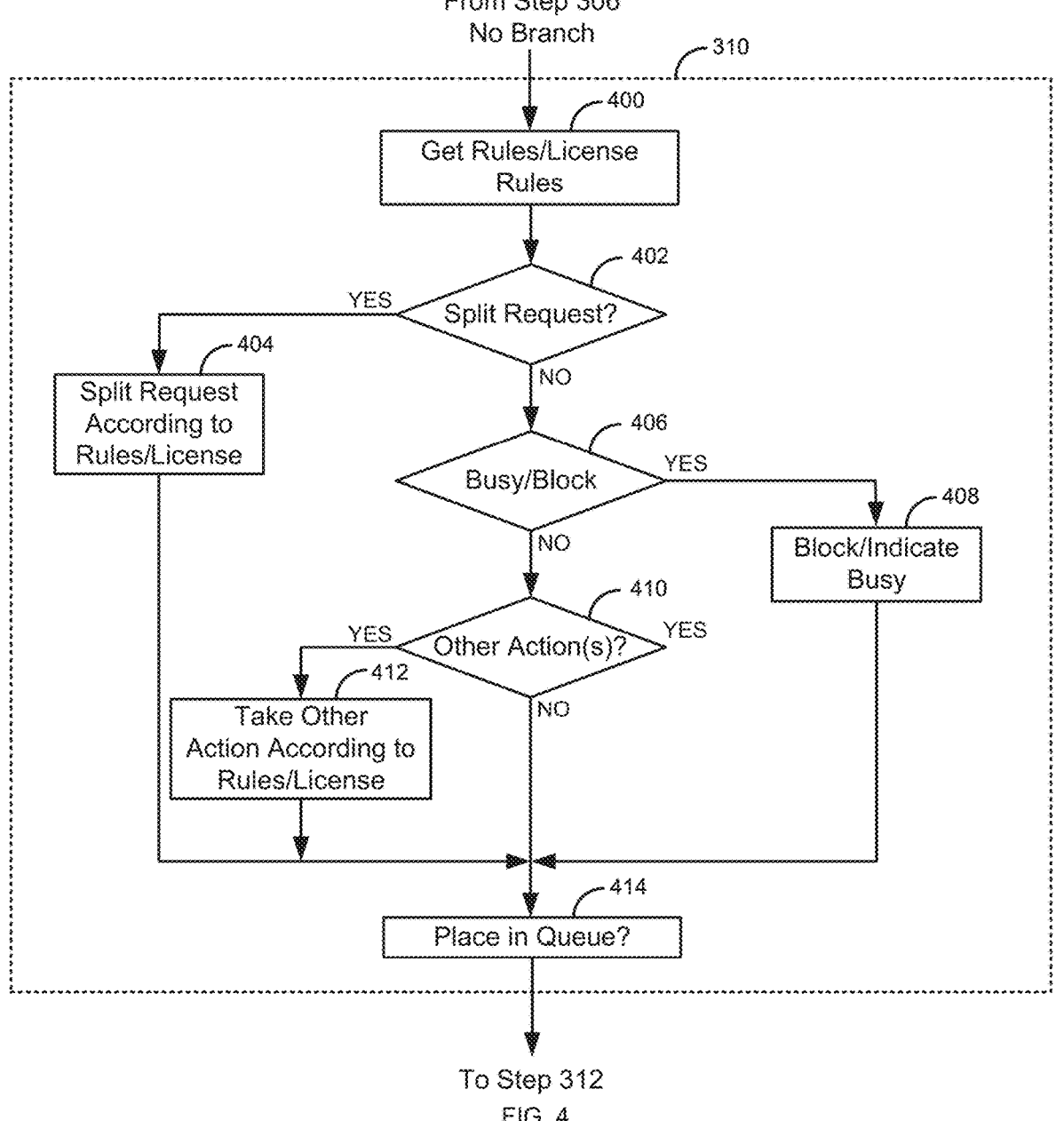
FIG. 4 is a flow diagram of a process for modifying requests based on computer-based licensing.

FIG. 4 is a flow diagram of a process for modifying requests 201 based on computer-based licensing. FIG. 4 is an exemplary embodiment of step 310 of FIG. 3. After not meeting the computer resource license 122 in step 306, the request service 121 gets rules/license rules in step 400. The rules/license rules may define how to manage an out of compliance request 201. The request service 121 determines, in step 402, if the rules indicate to split the request 201. For example, if the request 201 is to implement 10,000 CIs in a second and the computer resource license 122 indicates that the maximum is 7,000 CIs a second, the request 201 may be split into two requests 201, one for 7,000 CIs and one for 3,000 CIs. The second request 201 for the 3,000 CIs may have a one second delay before it is posted in the queue 123 so it is compliant with the computer resource license 122. Alternatively, the second request 201 for the 3,000 CIs may have a lower priority in the queue 123. The process then goes to step 414.

Otherwise, if the rules do not indicate splitting the request 201 in step 402, the request service 121 determines, in step 406, if the request 201 should be blocked or if the request service 121 should indicate that it is busy. If the rules determine, in step 406, that the request service 121 should block the request 201 or indicate that the request service 121 is busy in step 406, the request service 121 either blocks the request 201 or indicates that the request service 121 is busy in step 408. The process then goes to step 414.

If the rules do not indicate to block or indicate the request service 121 is busy in step 406, the request service 121 determines, in step 410, if other action(s) are to be implemented. Another type of action may be changing the priority of the whole action. For example, if the maximum CIs a second is 7,000 CIs and the request 201 is for 10,000 CIs a second, the action may be to change the request 201 for 10,000 CIs a second to a lower priority. Thus, the request 201 may still be met if the queue 123 is lightly loaded or empty. In this example, the queue 123 may delay processing of lower priority request 201 for a specific time period. If the other type of action is to be taken in step 410, the other actions are taken, in step 412, according to the rules/license rules and the process goes to step 414. If there are no other actions to take in step 410, the process goes to step 414.

The request service 121 places the request 201 into the queue 123 (if there is one), in step 414. The process then goes to step 312.

Figure 5:
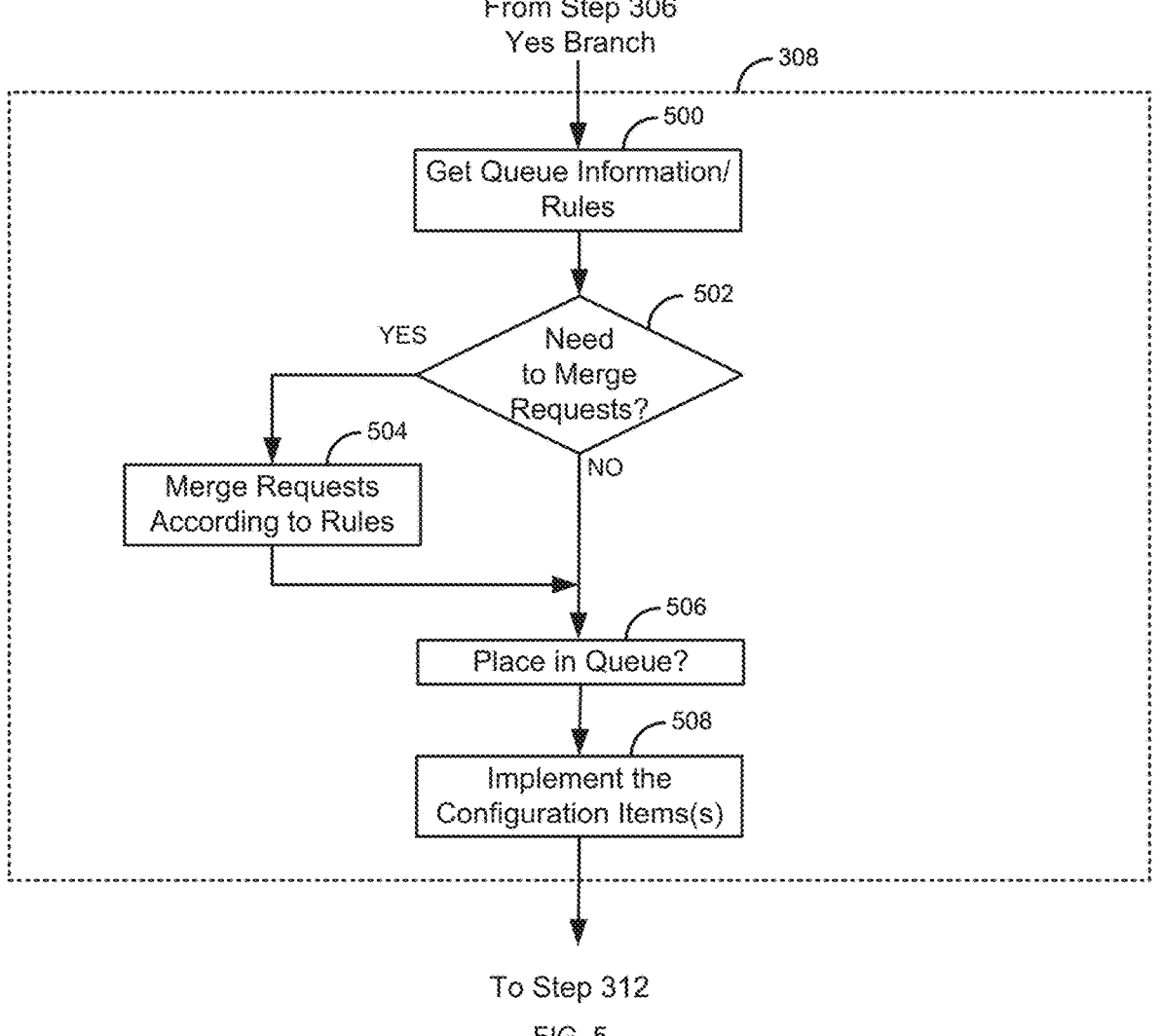
FIG. 5 is a flow diagram of a process for merging requests.

FIG. 5 is a flow diagram of a process for merging requests 201 FIG. 5 is an exemplary embodiment of step 308 of FIG. 3. After determining in step 306 that the request 201 meets the computer resource license 122, the request service 121 gets queue information/rules in step 500. The queue information/rules identify how valid requests 201 can be managed. The request service 121 determines, in step 502, if multiple requests 201 are to be merged. A request 201 may be merged in various ways, such as the request 201 may be merged into an existing request 201 in the queue 123. The existing request 201 may be the last request 201 in the queue 123, or a request 201 higher priority in the queue 123. For example, if the tenant submitted a previous request 201 that is higher in the queue 123 (ahead of a lower priority request 201), the request service 121 may merge the two requests 201 into a single request 201. If the request 201 is to be merged in step 502, the request 201 is merged in step 504 according to the rules and the process goes to step 506 where the merged request 201 is placed in the queue 123.

Otherwise, if the request 201 is not to be merged in step 502, the request 201 is placed in the queue 123 in step 506 (assuming there is a queue 123). The CIs are then implemented in step 508. The process then goes to step 312.

Figure 6:
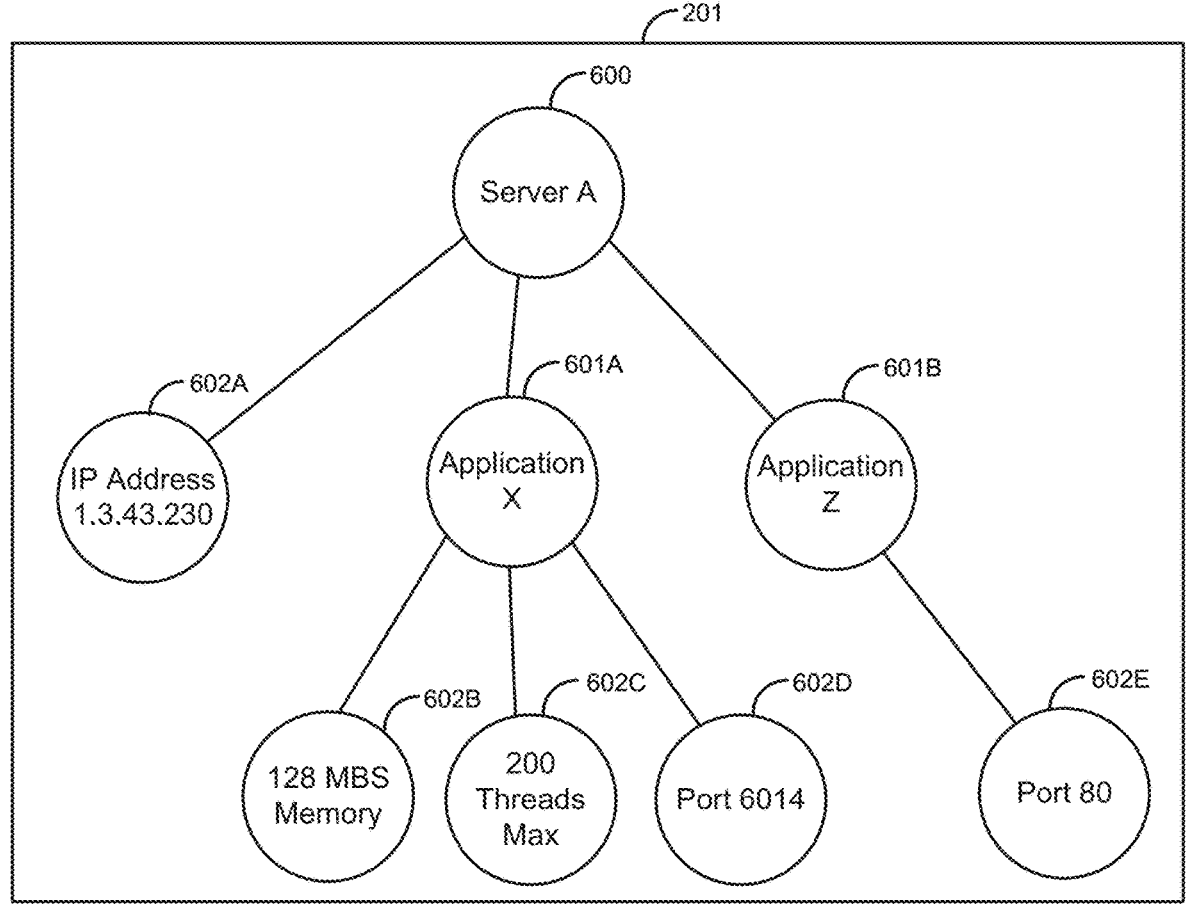
FIG. 6 is a diagram of a set of set of Configuration Items (CIs) and their associated relationships in a request.

FIG. 6 is a diagram of a set of set of Configuration Items (CIs) 602A-602E and their associated relationships in a request 201. The request 201 of FIG. 6 comprises a server data 600, application data 601A-601B and configuration items 602A-602E. The set of CIs 602A-602E represent a request 201 (e.g., the request 201 of step 302). The server data 600 and the application data 601A-601B are relationship data associated with the CIs 602A-602E. The CI 602A (IP address of 1.3.43.230) has an associated relationship to the server A (server data 600). The CI 602B (128 MBS maximum memory) has an associated relationship with the application 124X (application node 601A) and the server A (server node 600). The CI 602C (200 maximum threads) has an associated relationship with the application 124X (application data 601A) and the server A (server data 600). Likewise, the CI 602D (port 6014) has an associated relationship with the application 124X (application data 601A) and the server A (server data 600). The CI 602E (port 80) has an associated relationship with the application 124Z (application data 601B) and the server A (server data 600).

In order for a CI 602 to be changed, the relationship data needs to be used to make the change. For example, to set/change the IP address of the server A to 1.3.43.230, the server data 600 is needed (e.g., if there are multiple servers).

The server data 600/application data 601A is needed to set/change the CIs 602B-602D (memory/threads/port). Likewise, the server data 600/application data 601B data is needed to set/change the CI 602E (port 80).

Figure 7:
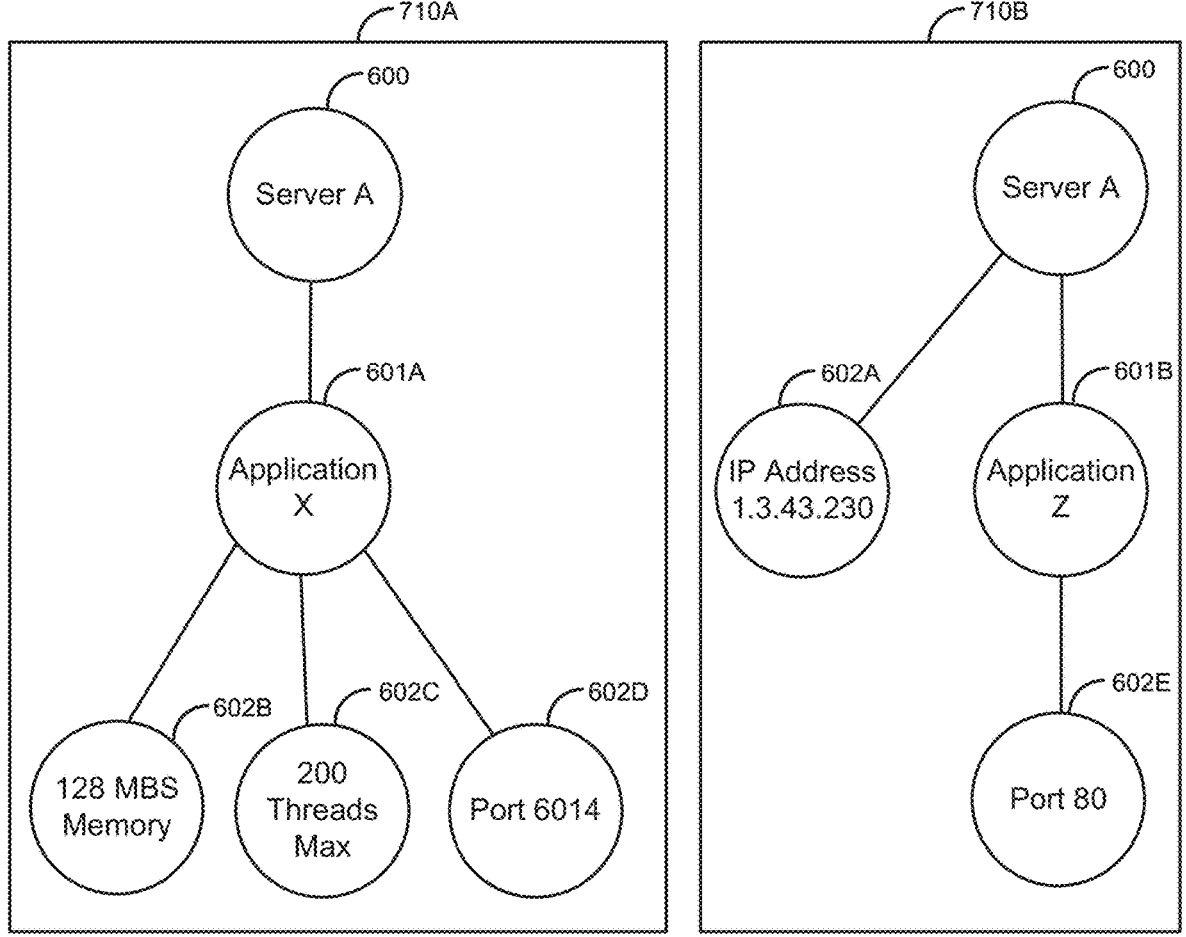
FIG. 7 is a diagram of a set of split requests and how data is duplicated in the split requests.

FIG. 7 is a diagram of a set of split Configuration Items (CIs) 602 and their associated relationships in a set of split requests 710A-710A. In FIG. 7, the request 201 has been split into two split requests 710A-710B, like discussed in step 404 of FIG. 4. In order to split the request 201, in some cases, some of the relationship data needs to be duplicated in the two split requests 710A-701B. The split request 710A comprises the server data 600, the application X data 601A and the CIs 602B-602D. The split request 710B comprises the server data 600, the application Z data 601B, and the CIs 602A and 602E.

Because each of the branches in the request 201 branch from the server data 600, the server data 600 needs to be duplicated in both the split requests 710A-710B. In other words, the specific server that the CI 602 resides on needs to be known before the CI 602 can be set/changed.

In theory, each CI 602 could be in a separate split request 710. For example, a first split record 710 could be created that comprises the server data 600 and the CI 602A. A second split record 710 could be created that comprises the server data 600, the application X data 601A, and the CI 602B. A third split record 710 could be created that comprises the server data 600, the application X data 601A, and the CI 602C. A fourth split record 710 could be created that comprises the server data 600, the application X data 601A, and the CI 602D and a fifth record that comprises the server data 600, the application Z data 601B, and the CI 602E.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, sub-combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
a microprocessor; and
a computer readable medium, coupled with the microprocessor and comprising microprocessor readable and executable instructions that, when executed by the microprocessor, cause the microprocessor to:
receive a first request from a first tenant of a multi-tenant cloud service comprising a computational resource accessible by the first tenant and a queue of a plurality of pending requests and corresponding to a set of queue data structures, the first tenant being associated with a plurality of users, wherein the first request comprises a first plurality of configuration items (CIs) comprising instructions to change data on the computational resource accessible by the first tenant and wherein the first plurality of CIs comprise one or more of: setting a memory size of the computational resource accessible by an application used by the first tenant; configuring a network comprising the computational resource; configuring an operating system of the computational resource; setting the computational resource's internet protocol (IP) address; changing a port number on a firewall of the computational resource; assigning inbound/outbound ports on the firewall; setting a user account of one or more of the plurality of users; defining IP address ranges used by a load balancer of the computational resource; defining maximum thread usage by the application used by the first tenant, the maximum thread usage being associated with the computational resource; defining virtual machine usage provided to the first tenant by the multi-tenant cloud service; configuring the virtual machine provided to the first tenant; defining first tenant container usage associated with the computational resource; allocating memory of the computational resource accessible by the application used by the first tenant; executing a database read command to read a record of the computational resource; and executing a database write command to modify or create a record of the computational resource;
identify a first computer resource license associated with the first tenant, the first computer resource license defining a number of CIs that may be requested within a defined time period;
determine if the first request meets the first computer resource license;
in response to the first request meeting the first computer resource license, update the set of queue data structures to add the first request to a corresponding queue position in the queue of the plurality of pending requests, and, when the first request advances to a selected queue position, implement each of the first plurality of CIs according to the first computer resource license; and in response to the first request not meeting the first computer resource license, modify the first request by splitting the first request into multiple split requests, each split request of the multiple split requests comprising a respective subset of the first plurality of CIs, and update the set of queue data structures to add each split request of the multiple split requests to different corresponding queue positions in the queue, each of the multiple split requests being implemented when the respective split request advances to the selected queue position.

2. The system of claim 1, wherein the first plurality of CIs comprise a plurality of: setting a memory size of the computational resource accessible by an application used by the first tenant; configuring a network comprising the computational resource; configuring an operating system of the computational resource; setting the computational resource's internet protocol (IP) address; changing a port number on a firewall of the computational resource; assigning inbound/outbound ports on the firewall; setting a user account of one or more of the plurality of users; defining IP address ranges used by a load balancer of the computational resource; defining maximum thread usage by the application used by the first tenant, the maximum thread usage being associated with the computational resource; defining virtual machine usage provided to the first tenant by the multi-tenant cloud service; configuring the virtual machine provided to the first tenant; defining first tenant container usage associated with the computational resource; allocating memory of the computational resource accessible by the application used by the first tenant; executing a database read command to read a record of the computational resource; and executing a database write command to modify or create a record of the computational resource.

3. The system of claim 1, wherein the first computer resource license is based on one or more specific types of CIs and wherein the first computer resource license comprises a relative priority rating for each tenant of the multi-tenant cloud service.

4. The system of claim 1, wherein the microprocessor readable and executable instructions further cause the microprocessor to:
receive a second request from a second tenant, wherein the second request comprises a second plurality of CIs;
identify a second computer resource license associated with the second tenant;
determine if the second request meets the second computer resource license;
in response to the second request meeting the second computer resource license, implement the second plurality of CIs according to the second computer resource license; and
in response to the second request not meeting the second computer resource license associated with the second tenant, modify the second request.

5. The system of claim 4, wherein modifying the second request comprises responding that the queue is busy or blocking the second request.

6. The system of claim 4, wherein modifying the second request comprises placing the second request lower in the queue.

7. The system of claim 1, wherein the first request does not meet the first computer resource license and wherein the modification of the first request is defined by a set of rules defining how to manage an out of compliance request.

8. The system of claim 1, wherein each of the first plurality of CIs comprises one or more of server data, application data, and one or more configuration items, the server data defining a relationship of a server with the one or more configuration items and the application data defining a relationship of an application with the one or more configuration items, and wherein splitting the first request into the multiple split requests comprises duplicating the one or more of server data and application data in the first request into each of the multiple split requests.

9. The system of claim 1, wherein the microprocessor readable and executable instructions further cause the microprocessor, in response to the first request meeting the first computer resource license, merge the first request with a second request associated with the first tenant.

10. The system of claim 1, wherein the first computer resource license is based on an amount of work required and/or a number of computational resources used by a CI type.

11. A method comprising:

receiving, by a microprocessor, a first request from a first tenant of a multi-tenant cloud service comprising a computational resource accessible by the first tenant and a queue of a plurality of pending requests and corresponding to a set of queue data structures, the first tenant being associated with a plurality of users, wherein the first request comprises a first plurality of configuration items (CIs) comprising instructions to change data on the computational resource accessible by the first tenant and wherein the first plurality of CIs comprise one or more of: setting a memory size of the computational resource accessible by an application used by the first tenant; configuring a network comprising the computational resource; configuring an operating system of the computational resource; setting the computational resource's internet protocol (IP) address; changing a port number on a firewall of the computational resource; assigning inbound/outbound ports on the firewall; setting a user account of one or more of the plurality of users; defining IP address ranges used by a load balancer of the computational resource; defining maximum thread usage by the application used by the first tenant, the maximum thread usage being associated with the computational resource; defining virtual machine usage provided to the first tenant by the multi-tenant cloud service; configuring the virtual machine provided to the first tenant; defining first tenant container usage associated with the computational resource; allocating memory of the computational resource accessible by the application used by the first tenant; executing a database read command to read a record of the computational resource; and executing a database write command to modify or create a record of the computational resource;

identifying, by the microprocessor, a first computer resource license associated with the first tenant, the first computer resource license defining a number of CIs that may be requested within a defined time period;

determining, by the microprocessor, if the first request meets the first computer resource license;

in response to the first request meeting the first computer resource license, updating the set of queue data structures to add the first request to a corresponding queue position in the queue of the plurality of pending requests, and, when the first request advances to a selected queue position, implementing, by the microprocessor, each of the first plurality of CIs according to the first computer resource license; and in response to the first request not meeting the first computer resource license, modifying, by the microprocessor, the first request by splitting the first request into multiple split requests, each split request of the multiple split requests comprising a respective subset of the first plurality of CIs, and updating the set of queue data structures to add each split request of the multiple split requests to different corresponding queue positions in the queue, each of the multiple split requests being implemented when the respective split request advances to the selected queue position.

12. The method of claim 11, wherein the first plurality of CIs comprise a plurality of: setting a memory size of the computational resource accessible by an application used by the first tenant; configuring a network comprising the computational resource; configuring an operating system of the computational resource; setting the computational resource's Internet Protocol (IP) address; changing a port number on a firewall of the computational resource; assigning inbound/outbound ports on the firewall; setting a user account of one or more of the plurality of users; defining IP address ranges used by a load balancer of the computational resource; defining maximum thread usage by the application used by the first tenant, the maximum thread usage being associated with the computational resource; defining virtual machine usage provided to the first tenant by the multi-tenant cloud service; configuring the virtual machine provided to the first tenant; defining first tenant container usage associated with the computational resource; allocating memory of the computational resource accessible by the application used by the first tenant; executing a database read command to read a record of the computational resource; and executing a database write command to modify or create a record of the computational resource.

13. The method of claim 11, wherein the first computer resource license is based on one or more specific types of CIs and wherein the first computer resource license comprises a relative priority rating for each tenant of the multi-tenant cloud service.

14. The method of claim 11, further comprising:

receiving a second request from a second tenant, wherein the second request comprises a second plurality of CIs;

identifying a second computer resource license associated with the second tenant;

determining if the second request meets the second computer resource license;

in response to the second request meeting the second computer resource license, implementing the second plurality of CIs according to the second computer resource license; and in response to the second request not meeting the second computer resource license associated with the second tenant, modifying the second request.

15. The method of claim 14, wherein modifying the second request comprises placing the second request lower in the queue.

16. The method of claim 11, wherein the first request does not meet the first computer resource license and wherein the modification of the first request is defined by a set of rules defining how to manage an out of compliance request.

17. The method of claim 11, wherein each of the first plurality of CIs comprises one or more of server data, application data, and one or more configuration items, the server data defining a relationship of a server with the one or more configuration items and the application data defining a relationship of an application with the one or more configuration items, and wherein splitting the first request into the multiple split requests comprises duplicating the one or more of server data and application data in the first request into each of the multiple split requests.

18. The method of claim 11, further comprising:

in response to the first request meeting the first computer resource license, merging the first request with a second request associated with the first tenant.

19. The method of claim 11, wherein the first computer resource license is based on an amount of work required and/or a number of computational resources used by a CI type.

20. A non-transient computer readable medium having stored thereon instructions that cause a processor to execute a method, the method comprising instructions to:

receive a first request from a first tenant of a multi-tenant cloud service comprising a computational resource accessible by the first tenant and a queue of a plurality of pending requests and corresponding to a set of queue data structures, the first tenant being associated with a plurality of users, wherein the first request comprises a first plurality of configuration items (CIs) comprising instructions to change data on the computational resource accessible by the first tenant and wherein the first plurality of CIs comprise one or more of: setting a memory size of the computational resource accessible by an application used by the first tenant; configuring a network comprising the computational resource; configuring an operating system of the computational resource; setting the computational resource's internet protocol (IP) address; changing a port number on a firewall of the computational resource; assigning inbound/outbound ports on the firewall; setting a user account of one or more of the plurality of users; defining IP address ranges used by a load balancer of the computational resource; defining maximum thread usage by the application used by the first tenant, the maximum thread usage being associated with the computational resource; defining virtual machine usage provided to the first tenant by the multi-tenant cloud service; configuring the virtual machine provided to the first tenant; defining first tenant container usage associated with the computational resource; allocating memory of the computational resource accessible by the application used by the first tenant; executing a database read command to read a record of the computational resource; and executing a database write command to modify or create a record of the computational resource;

identify a first computer resource license associated with the first tenant, the first computer resource license defining a number of CIs that may be requested within a defined time period;

determine if the first request meets the first computer resource license;

in response to the first request meeting the first computer resource license, merge the first request with a second request from the first tenant, the second request meeting the first computer resource license, update the set of queue data structures to add the merged first and second requests to a corresponding queue position in the queue of the plurality of pending requests, and, when the merged first and second requests advance to a selected queue position, implement the CIs in the merged first and second requests according to the first computer resource license; and in response to the first request not meeting the first computer resource license, modify the first request by splitting the first request into multiple split requests, each split request of the multiple split requests comprising a respective subset of the first plurality of CIs, and update the set of queue data structures to add each split request of the multiple split requests to different corresponding queue positions in the queue, each of the multiple split requests being implemented when the respective split request advances to the selected queue position.

* * * * *